United States Patent
Lee et al.

(10) Patent No.: US 10,576,834 B2
(45) Date of Patent: Mar. 3, 2020

(54) APPARATUS AND METHOD FOR CHARGING ELECTRIC VEHICLE VIA PLURAL CHARGERS

(71) Applicant: Hyundai Motor Company, Seoul (KR)

(72) Inventors: Jae Won Lee, Gyeonggi-do (KR); Soung Han Noh, Gyeonggi-do (KR); Jae Hyeon Park, Seoul (KR); Heuk Jin Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 155 days.

(21) Appl. No.: 15/250,158

(22) Filed: Aug. 29, 2016

(65) Prior Publication Data

US 2017/0274791 A1 Sep. 28, 2017

(30) Foreign Application Priority Data

Mar. 22, 2016 (KR) .......................... 10-2016-0034060

(51) Int. Cl.
 *B60L 11/18* (2006.01)
 *B60L 53/65* (2019.01)
 (Continued)

(52) U.S. Cl.
 CPC ........... *B60L 11/1838* (2013.01); *B60L 53/20* (2019.02); *B60L 53/60* (2019.02); *B60L 53/63* (2019.02); *B60L 53/65* (2019.02); *B60L 55/00* (2019.02); *B60L 58/12* (2019.02); *B60L 58/16* (2019.02); *B60L 2240/545* (2013.01); *B60L 2240/547* (2013.01); *B60L 2240/549* (2013.01); *B60L 2240/80* (2013.01); *Y02E 60/721* (2013.01);

(Continued)

(58) Field of Classification Search
 CPC .............. B60L 11/1838; B60L 11/1811; B60L 11/1809; B60L 11/1824; B60L 11/1851; B60L 11/1855; B60L 11/1861; H02J 7/022; Y02T 10/7005; Y02T 90/14; Y02T 90/121; H02M 1/44; H04Q 9/14
 USPC .................................................. 320/109, 106
 See application file for complete search history.

(56) References Cited

U.S. PATENT DOCUMENTS 5,296,797 A * 3/1994 Bartlett ................. H02J 7/0085
 320/133
5,506,490 A * 4/1996 DeMuro ................ H02J 7/0011
 320/106

(Continued)

FOREIGN PATENT DOCUMENTS

JP 2007-097298 A 4/2007
JP 2007-116892 A 5/2007

(Continued)

*Primary Examiner* — Drew A Dunn
*Assistant Examiner* — Tessema Kebede
(74) *Attorney, Agent, or Firm* — Mintz Levin Cohn Ferris Glovsky and Popeo, P.C.; Peter F. Corless (57) ABSTRACT

A method for controlling plural chargers equipped in a vehicle includes: recognizing a plurality of chargers, each configured to charge at least one battery supplying the vehicle with electric power, via an in-vehicle network; receiving an identification and at least one parameter from each recognized charger, which are delivered via the in-vehicle network; generating plural instructions, each instruction for each recognized charger in response to receiving the identification and the at least one parameter; and delivering the plural instructions to the plurality of recognized chargers via the in-vehicle network.

20 Claims, 8 Drawing Sheets

(51) Int. Cl.
  *B60L 58/16* (2019.01)
  *B60L 58/12* (2019.01)
  *B60L 53/60* (2019.01)
  *B60L 53/63* (2019.01)
  *B60L 55/00* (2019.01)
  *B60L 53/20* (2019.01)
(52) U.S. Cl.
  CPC .......... *Y02T 10/7005* (2013.01); *Y02T 10/705* (2013.01); *Y02T 10/7044* (2013.01); *Y02T 10/7072* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

| | | | | |
|---|---|---|---|---|
| 5,640,076 | A * | 6/1997 | Youn | B60L 3/0069 320/138 |
| 2011/0050168 | A1 * | 3/2011 | Yoo | B60L 53/65 320/109 |
| 2013/0020993 | A1 * | 1/2013 | Taddeo | H02J 7/0027 320/109 |
| 2013/0320922 | A1 * | 12/2013 | Acena | B60L 11/1811 320/109 |
| 2014/0267712 | A1 * | 9/2014 | Foerster | G08B 13/1445 348/143 |
| 2014/0361744 | A1 * | 12/2014 | Han | B60L 11/1824 320/109 |
| 2015/0175020 | A1 * | 6/2015 | Kim | B60L 3/003 320/109 |
| 2017/0187200 | A1 * | 6/2017 | Somerville | H02J 7/0052 |

FOREIGN PATENT DOCUMENTS

| | | | |
|---|---|---|---|
| JP | 2014-068466 | A | 4/2014 |
| JP | 2014-192960 | A | 10/2014 |
| JP | 2014192960 | * | 10/2014 |
| KR | 10-1996-0700554 | A | 5/1999 |
| KR | 2006-0100054 | A | 9/2006 |
| KR | 10-2006-0123435 | A | 12/2006 |
| KR | 2009-0011171 | A | 2/2009 |
| KR | 10-2012-0006538 | A | 1/2012 |
| KR | 20-2012-0005628 | U | 8/2012 |
| KR | 10-2013-0120235 | A | 11/2013 |
| KR | 10-2013-0122676 | A | 11/2013 |
| KR | 10-2015-0035794 | A | 4/2015 |

* cited by examiner

APPARATUS AND METHOD FOR CHARGING ELECTRIC VEHICLE VIA PLURAL CHARGERS

CROSS-REFERENCE TO RELATED APPLICATION

This application claims priority to and the benefit of Korean Patent Application No. 10-2016-0034060, filed on Mar. 22, 2016 in the Korean Intellectual Property Office, the disclosure of which is hereby incorporated by reference in its entirety as if fully set forth herein.

TECHNICAL FIELD

The disclosure relates generally to an apparatus and a method for charging an electric vehicle via plural chargers, and more particularly, to a control apparatus and a control method for a charging operation between electric vehicle(s) or vehicle charging equipment including plural chargers.

BACKGROUND

Environmentally friendly cars (also known as green cars or eco-friendly cars), including both hybrid vehicles (HEVs) and electric vehicles (EVs), are well known. Typically, the HEV uses two or more distinct types of power, such as an internal combustion engine and an electric motor, while the EV is propelled by one or more electric motors, using electrical energy stored in rechargeable batteries or other energy storage device. While operating, the HEV can use a generator to make a battery self-powered so that the battery can supply power for vehicle operation. The HEV can include a regenerative braking system which converts its kinetic energy occurred by a counter-rotating motor during braking of the vehicle into an electric form either used immediately or stored in batteries for later use in order to increase energy efficiency.

Like many electronic devices, the EV is designed to operate after being charged. Charging equipment for charging a battery equipped in the EV can be implemented in various types or structures. For example, one type of charging equipment is an On-Board Charger (OBC) equipped in the EV for converting an Alternating Current (AC) power into a Direct Current (DC) power to charge the battery. Since it is installed in the EV, the OBC should be controllable via internal communications with other devices or equipment included in the EV. Further, an operational liability of the OBC as one of vehicle parts is required, and downsizing or lightening of the OBC can be a critical issue for its design.

For designing a charging device configured to charge the EV, there might be some important issues such that an overall capacity of a battery or batteries included in the EV continues to increase, and reducing a charging time is required for vehicle mobility even though the capacity of batteries is increased. However, so as to reduce a charging time for plural batteries equipped in the EV, a lot of cost and time can be spent on designing and installing plural different chargers, each corresponding to different charging capabilities. Further, in order to correspond with different charging capabilities of plural batteries included in the EV, a charging device equipped in the EV can be required to have an additional device for power conversion.

To overcome above-described issues, an apparatus or a method for charging plural chargeable units, each coupled in parallel, equipped in the EV can be applicable. However, there is difficulty in controlling the plural chargeable units en bloc because the plural chargeable unit can operates individually.

SUMMARY

An apparatus and a method are described herein for coupling plural chargers, equipped in an electric vehicle, in parallel so as to reduce a charging time spent on a mass battery. Further, an apparatus and a method are described herein for controlling parallel-connected plural chargers equipped in an electric vehicle can recognize plural chargers via a predetermined resistance or a pulse width modulation (PWM) signal used in in-vehicle communications in order to simplify operations or procedures for controlling or performing vehicle charging operation.

In accordance with embodiments of the present disclosure, a method for controlling plural chargers equipped in a vehicle includes: recognizing a plurality of chargers, each configured to charge at least one battery supplying the vehicle with electric power, via an in-vehicle network; receiving an identification and at least one parameter from each recognized charger, which are delivered via the in-vehicle network; generating plural instructions, each instruction for each recognized charger in response to receiving the identification and the at least one parameter; and delivering the plural instructions to the plurality of recognized chargers via the in-vehicle network.

The identification and the at least one parameter from each charger can correspond to resistances having different values.

The identification and the at least one parameter from each charger can correspond to pulse width modulation signals having different pulse widths.

The plurality of chargers may be equipped in the vehicle to connect an external power source with the at least one battery and coupled in parallel with each other.

The step of delivering the plural instructions includes monitoring a status of each of the plurality of chargers to determine an availability of each charger, monitoring a power signal provided by an external power source, and distributing the power signal according to the determined availability of each charger.

The power signal can include at least one of an Alternating Current (AC) power signal and a Direct Current (DC) power signal, and a given charger which receives the power signal can convert the power signal into a DC voltage signal having a predetermined range.

The in-vehicle network can include a controller area network (CAN).

Furthermore, in accordance with embodiments of the present disclosure, an apparatus having plural chargers for controlling a vehicle charging operation includes: an identification signal generator generating an identification signal used to recognize a plurality of chargers configured to charge at least one battery supplying the vehicle with electric power; a power transceiver transmitting at least one charging control signal to an external power source, or receiving the at least one charging control signal from the external power source; and a charger controller controlling each recognized charger so as to perform a charging operation corresponding to the at least one charging control signal based on the identification signal.

The identification signal generator can include either plural pull-up or plural pull-down resistances having different values.

The identification signal can include a pulse width modulation signal having a different pulse width for each of the plurality of chargers.

The identification signal generator can include a plurality of modules, each corresponding to each of the plurality of chargers.

The plurality of chargers may be equipped in the vehicle to connect the external power source with the at least one battery and coupled in parallel with each other.

A power signal inputted into the plurality of chargers can include at least one of an Alternating Current (AC) power signal and a Direct Current (DC) power signal, and a given charger which receives the power signal can convert the power signal into a DC voltage signal having a predetermined range.

The given charger can include: a voltage convertor converting the DC power signal into the DC voltage signal having the predetermined range; and a switch controlling an output of the voltage convertor, wherein the switch is controlled by the charger controller.

The given charger can also include: an Electromagnetic Interferences (EMI) filter removing noise from the AC power signal; a rectifier converting an output of the EMI filter into a DC signal; a voltage convertor converting the DC signal, outputted from the rectifier, into the DC voltage signal having the predetermined range; and a switch controlling an output of the voltage convertor, wherein the switch is controlled by the charger controller.

Furthermore, according to embodiments of the present disclosure, a vehicle equipped with an apparatus configured to obtain motive power from electric energy includes: a battery unit including at least one battery configured to supply the electric energy; a charger unit including a plurality of chargers connected with each other in parallel, each configured to use a power signal for charging the at least one battery, where the power signal is provided by an external power source; and a charging controller controlling the plurality of chargers based at least on a charging control signal provided by the external power source.

The charging controller can include: an identification signal generator generating an identification signal for recognizing each of the plurality of chargers; and a power transceiver transmitting at least one of the power signal and the charging control signal to the external power source, or receiving at least one of the power signal and the charging control signal from the external power source, wherein the charger controller controls each charger so as to perform a charging operation corresponding to the charging control signal based on the identification signal.

The identification signal can be determined based on resistances corresponding to each charger, each resistance having different values from one another, or based on pulse width modulation signals corresponding to each charger, each pulse width modulation signal having a different pulse width from one another.

The battery unit can include a battery management system indicating a battery cell status to the charging controller in order to achieve charging equilibrium between plural battery cells included in the at least one battery.

The battery management system can monitor at least one of an output current level, an output voltage level, and a temperature in real-time, measure a state of charge of the at least one battery, and estimate a replacement time of the at least one battery.

Furthermore, in accordance with embodiments of the present disclosure, the apparatus for controlling plural chargers equipped in a vehicle can include a processing system that comprises at least one data processor and at least one computer-readable memory storing a computer program. Herein, the processing system is configured to cause the apparatus to operate as described above.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Reference will now be made in detail to the embodiments of the disclosure, examples of which are illustrated in the accompanying drawings. As those skilled in the art would realize, the described embodiments may be modified in various different ways, all without departing from the spirit or scope of the present disclosure. In the drawings, the same elements are denoted by the same reference numerals, and a repeated explanation thereof will not be given. The suffixes "module" and "unit" of elements herein are used for convenience of description and thus can be used interchangeably and do not have any distinguishable meanings or functions.

The terms "a" or "an", as used herein, are defined as one or more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

In the description of the disclosure, certain detailed explanations of related art are omitted when it is deemed that they may unnecessarily obscure the essence of the disclosure. The features of the disclosure will be more clearly understood from the accompanying drawings and should not be limited by the accompanying drawings. It is to be appreciated that all changes, equivalents, and substitutes that do not depart from the spirit and technical scope of the disclosure are encompassed in the disclosure.

In environmentally friendly vehicles (also known as a green cars or eco-friendly cars), when energy such as a motive power for driving a vehicle is obtained via a battery, or as enhanced driving performance is required, an electric energy capacity of the battery equipped in the vehicle, i.e., a battery capacity, may increase. Typically, if a capacity of in-vehicle battery increases, a time necessary for fully charging the in-vehicle battery will increase. Since an extended charging time can deteriorate the vehicle's mobility, reducing the charging time in order that a mass battery can be charged quickly would be required. However, excessive costs can be required to use a conventional device for boosting charge to either a battery charger equipped in a vehicle or vehicle charging equipment as infrastructure that supplies an electric energy into the vehicle. Accordingly, a charger such as an On-Board Charger (OBC) is often equipped in a vehicle so that even household electricity can be used for charging an in-vehicle battery.

By way of example but not limitation, when an OBC is equipped in a vehicle, high power density and low noise may be required. To improve these characteristics, OBC's switching frequency may be increased. Additionally, in order to enhance energy efficiency for the vehicle, the OBC need a higher efficiency. Furthermore, the OBC is required to have wide input or output operational ranges such as an universal input voltage range (e.g., 100 $V_{ac}$ to 240 $V_{ac}$) or an in-vehicle battery voltage range (e.g., 220 $V_{dc}$ to 420 $V_{dc}$) in order to work compatibly with a charging infrastructure or an in-vehicle battery. Recently, as the capacity of batteries equipped in vehicles grows, a charging platform applicable to chargers or charging equipment used for charging the batteries have been required to supply or handle a power signal of 3.3 kW to 6.6 kW. Further, to reduce the charging time, the charging platform should be designed to handle a larger power signal later.

Based at least on the change of capabilities of batteries or charging equipment, using plural chargers coupled with each other in parallel can be more effective in light of design, costs, etc. than developing a new charger suitable for a new standard or requirement. To use plural chargers, a control program, method, or apparatus for handling each charger is required.

Each charger can communicate via an in-vehicle network, such as a controller area network (CAN). For internal communications with plural chargers, individual or separate identifier (e.g., CAN ID) is required to recognize each charger. In addition, a protocol might be required to make an in-vehicle controller control plural chargers.

To effective use plural chargers, it is necessary that each of plural chargers is controlled individually by a controller based at least on a charging status. For example, during a charging operation, a first charger could be stopped while a second charger continuously works. Or, the first and second chargers might be stopped based on a particular condition. It might be required that, during a charging operation, plural chargers are controlled to operate based on various conditions or circumstances such as a protection process for a charger, a derating process for improving a reliability by lessening loads (or an operation stress) on the charger below a threshold, or the like.

Figure 1:
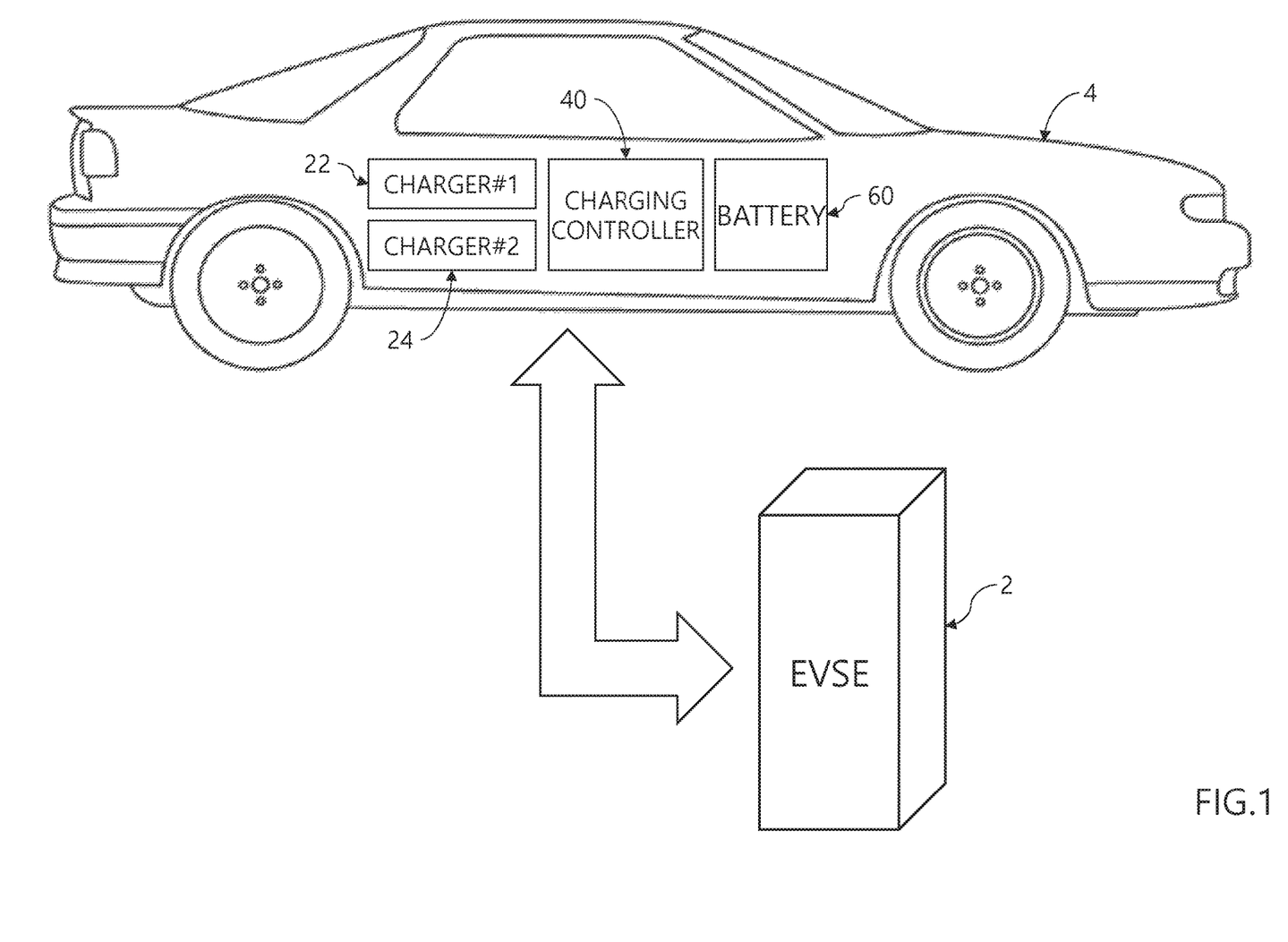
FIG. 1 shows a method for charging a vehicle via charging equipment.

Referring now to the presently disclosed embodiments, FIG. 1 shows a method for charging a vehicle via charging equipment.

As shown in FIG. 1, when charging an in-vehicle battery 60, a vehicle 4 can be coupled to electric vehicle supply equipment (EVSE) 2 so that the in-vehicle battery 60 can store an amount of electric energy. The vehicle 4 and the EVSE 2 can be coupled with each other via a Power Line Communication (PLC) method, a wired or wireless (data) communication method, and the like. The EVSE 2 equipped for charging the vehicle 4 can locate at a home, a charging station, a multi-unit dwelling such as an apartment, and so on.

The vehicle 4 can include plural chargers 22, 24 configured to charge the in-vehicle battery 60. The plural chargers 22, 24 can be coupled with each other in parallel between the EVSE 2 and the in-vehicle battery 60 in a view of electric circuitry. By way of example but not limitation, if a single charger 22 (or 24) can perform a charging operation based on a power signal of 3.3 kW, two chargers 22, 24 can use a power signal of 6.6 kW for charging the in-vehicle battery 60.

The vehicle 4 can include a charging controller 40 configured to control the plural chargers 22, 24. In a case when the vehicle 4 includes the plural chargers 22, 24, it is likely that the charging controller 40 is required to control the plural chargers 22, 24 individually based at least on a state of charge.

If a component or an element corresponding to the charging controller 40 is not included in the vehicle 4, each charger 22, 24 can at least include a control program handling additional software, various parameters and etc. for communication and co-operation with another charger or the in-vehicle battery. In addition, each charger 22, 24 can operate respectively based at least on a control signal and a power signal delivered from an external power source such as the EVSE 2. If the plural chargers 22, 24 perform a charging operation individually, efficiency of the charging operation can be decreased. Further, according to specifications of the EVSE 2 and/or the in-vehicle battery 60 equipped in the vehicle 4, various types or versions of chargers 22, 24 could be required.

Further, when functions for controlling the plural chargers 22, 24 are adapted in a central processing unit (CPU) or a conventional battery management system (BMS) included in the vehicle 4, more amounts of loads can be allocated to the CPU or the BMS, as well as internal communications inside the vehicle 4 can become more complicated. In addition, in this case, it might be not allowed that another charger is equipped additionally based at least on customer's needs within the vehicle 4 which has already manufactured or sold.

The charging controller 40 can support a method for using the plural chargers 22, 24 in the vehicle 4. The charging controller 40 can control a charging operation using the plural chargers 22, 24 such as activation/inactivation (ON/OFF), monitoring a charging current level, balancing loads, or the like, as well as be served as a gateway of the vehicle 4 against an external power source such as the EVSE 2. For the way of example but not limitation, the charging controller 40 can receive an external communication signal (e.g., CAN signals), an charger connection signal (e.g., CAN signals, Protocol Data Units (PDU) signals), an external vehicle signal, or the like, and provide state of charge and control-related information into the plural chargers 22, 24 via at least one of a circuitry or a programmable logic associated with a vehicle charging operation.

The charging controller 40 can be directed to control overall charging operations incurred within the vehicle 4, and control a single On-Board Charger (OBC) as well as n-tuple OBCs (n is an integer larger than 1). By way of example but not limitation, to perform communications with the plural chargers 22, 24, the charging controller 40 can match each of chargers with each resistance so as to recognize an identifier ID of each charger. This method can achieve exemplary communications between the charging controller 40 and the plural chargers 22, 24 via the in-vehicle network.

The charging controller 40 can receive an external signal and a CAN message to determine overall procedures or logics related to a charging operation such as a mechanism, a control step, and the like. Each charger 22, 24 engaged with the charging controller 40 can include the same programs or components, or have different communication identification (CAN ID) and a different priority. Because of the charging controller 40 equipped in the vehicle, it may be not necessary to perform at least one process for impedance matching based on the number of the plural chargers 22, 24. In addition, the charging controller 40 can handle a charging operation status of each charger 22, 24 based at least one on a state of charge at critical or threshold timings (e.g., decision timings of terminating a charging operation, limiting/restricting current flows, and so on), so that an overall charging operation can be performed more safely.

In a case when the charging controller 40 controls the plural chargers 22, 24, even if a specification may be changed, it can be sufficient for designing or developing an in-vehicle charging device to manage or update plural programs, each installed in the plural chargers 22, 24. Further, it is possible to add a new charger or remove an installed charger after the vehicle 4 has been manufactured. During a charging operation, distributing or balancing loads to the plural chargers 22, 24 can be more effective.

Figure 2:
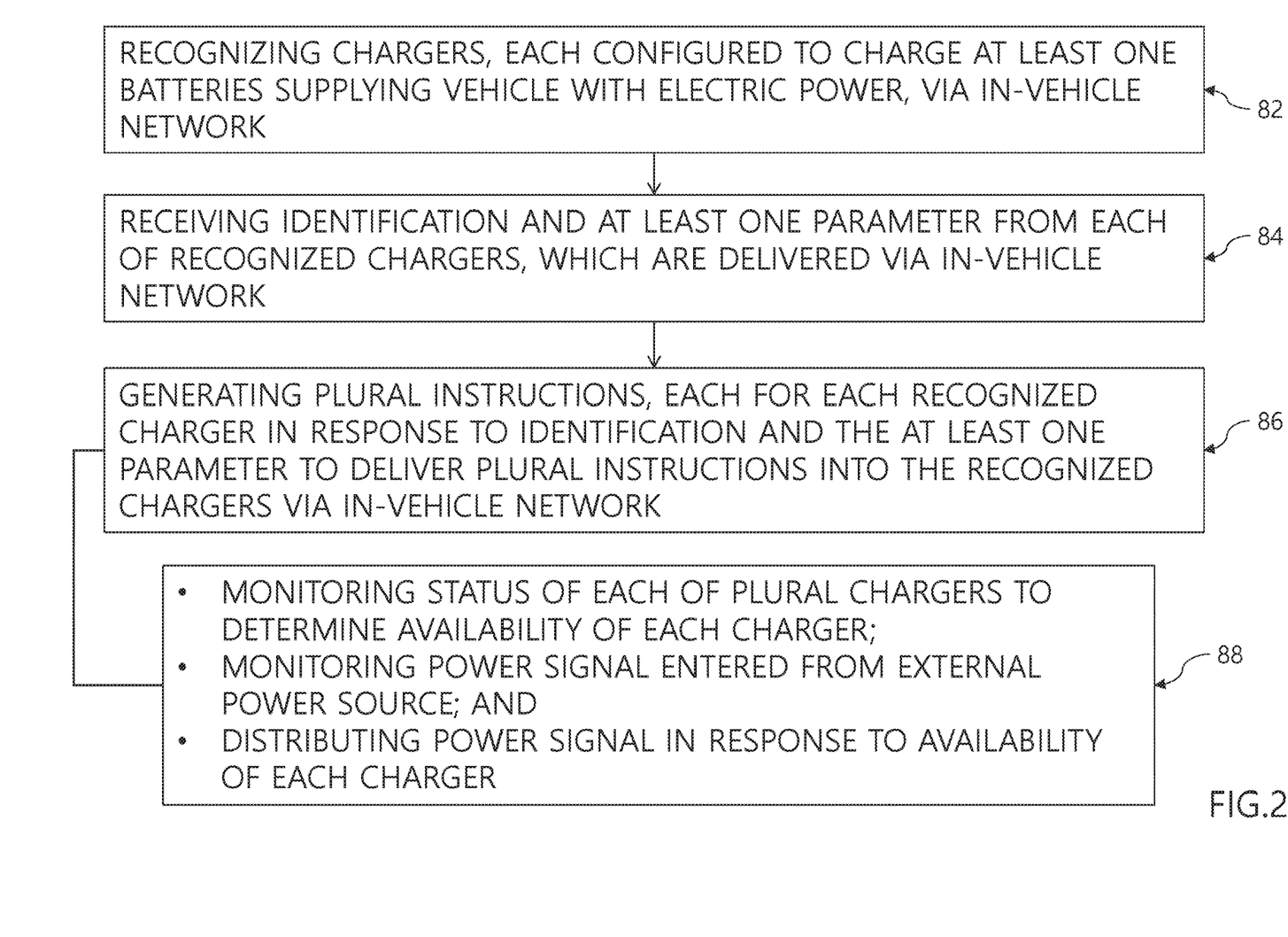
FIG. 2 describes a method for controlling plural chargers equipped in a vehicle.

FIG. 2 describes a method for controlling plural chargers equipped in a vehicle.

As shown in FIG. 2, the method can include recognizing a plurality of chargers, each configured to charge at least one batteries supplying a vehicle with an electric power, via an in-vehicle network (step 82), receiving an identification and at least one parameter from each of recognized chargers, which are delivered via the in-vehicle network (step 84), and generating plural instructions, each for each recognized charger in response to the identification and the at least one parameter to deliver the plural instructions into the recognized chargers via the in-vehicle network (step 86).

Further, the step of generating and delivering the plural instructions (step 86) can include at least one of monitoring a status of each of the plurality of chargers to determine an availability of each charger (step 88), monitoring a power signal entered from an external power source (step 88), and distributing the power signal in response to the availability of each charger (step 88).

A charging controller engaged with plural chargers can generate an identification signal corresponding to each of the plural chargers. By way of example but not limitation, the identification signal and the parameter assigned to each charger can be made based at least on each of plural resistances having a different value, each resistance corresponding with each charger. In addition, the identification signal and the parameter for each charger can correspond with a pulse width modulation signal having a different pulse width. Each charger can deliver a signal including the identification, the parameter or the like into the charging controller, while the charging controller can deliver an instruction including the identification, the parameter or the like into each charger related to a charging operation. In addition, the charging controller can communicate with each charger via an in-vehicle network such as a Controller Area Network (CAN) in order to transmit and receive information about state of charge.

The plurality of chargers, which are equipped within a vehicle to connect an external power source with the at least one batteries, can be coupled in parallel with each other. The power signal delivered from the external power source can include at least one of Alternating Current (AC) power signal and a Direct Current (DC) power signal. Further, the charger can convert the power signal into a Direct Current (DC) voltage signal having a predetermined range to supply the converted DC voltage signal into a battery.

Figure 3:
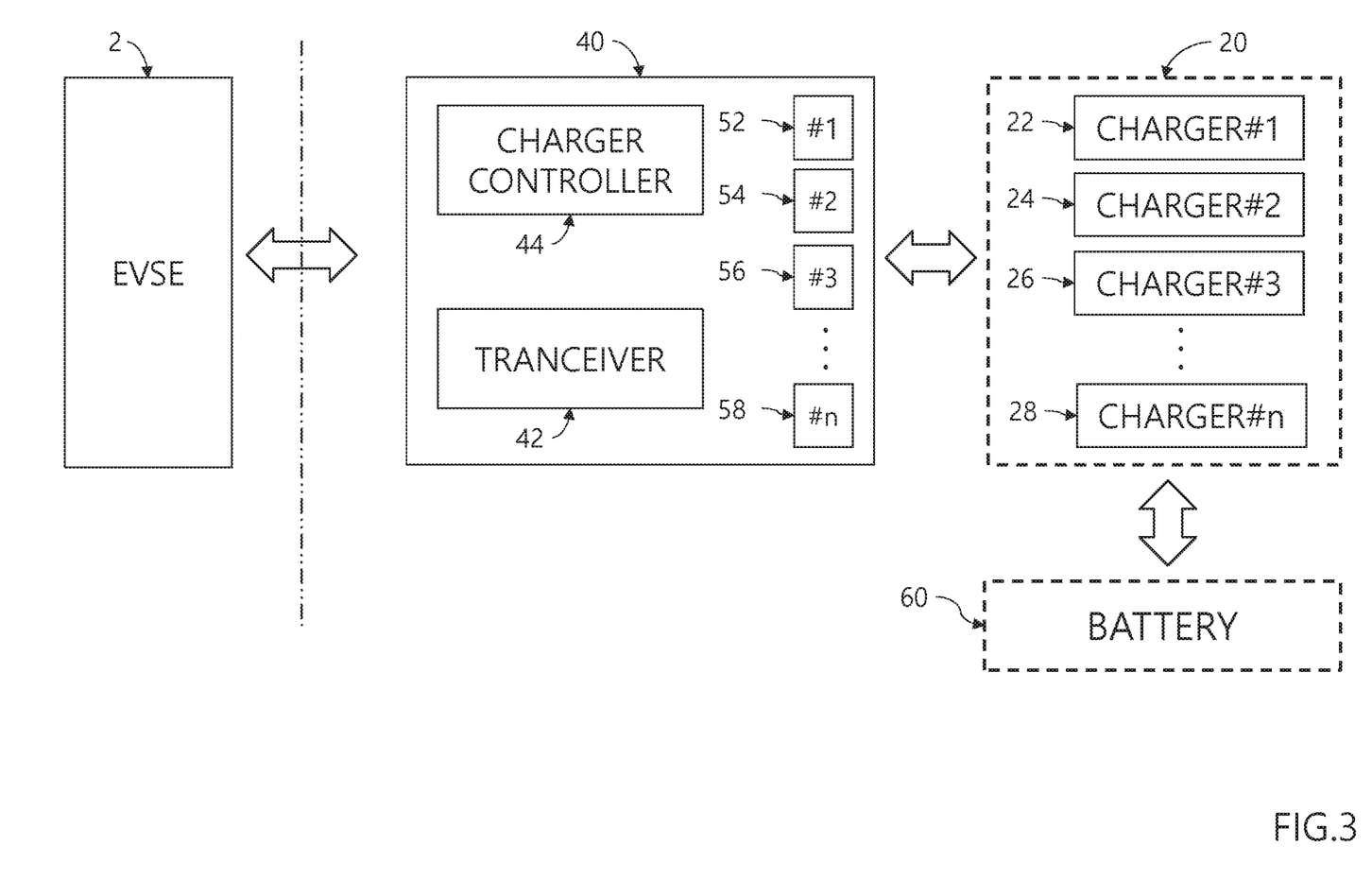
FIG. 3 shows an in-vehicle charging apparatus.

FIG. 3 shows an in-vehicle charging apparatus.

As shown in FIG. 3, the in-vehicle charging apparatus, engaged with an external power source such as the EVSE 2, can include a battery unit 60 including at least one battery configured to store and supply the electric energy into a vehicle, a charger unit 20 including a plurality of chargers 22, 24, 26, 28 connected with each other in parallel, each configured to use a power signal for charging the at least one battery, and a charging controller 40 configured to control the plurality of chargers 22, 24, 26, 28 based at least on a charging control signal delivered from an external power source. Herein, the power signal can be inputted from the external power source.

Particularly, the charging controller 40 can include an identification signal generator 52, 54, 56, 58 configured to generate an identification signal used for recognizing each of the plurality of chargers 22, 24, 26, 28, a power transceiver 2 configured to transmit at least one charging control signal to, or receive at least one charging control signal from, the external power source such as EVSE 2, and a charger controller 44 configured to arrange a charging operation corresponding to the at least one charging control signal to each charger based on the identification signal. Herein, the identification signal generator 52, 54, 56, 58 can be implemented in a single unit, component or circuit. Or, the identification signal generator 52, 54, 56, 58 can include plural modules each corresponding to each of the plurality of chargers 22, 24, 26, 28.

The power signal delivered from EVSE 2 and inputted into the plurality of chargers 22, 24, 26, 28 can include at least one of Alternating Current (AC) power signal and a Direct Current (DC) power signal. The plurality of chargers 22, 24, 26, 28 included in the charger unit 20 can convert the power signal into a Direct Current (DC) voltage signal having a predetermined range to supply the DC voltage signal into the battery unit 60. Herein, the predetermined range of the DC voltage signal can be determined based at least on a performance, a specification or an operational condition.

Figure 4A:
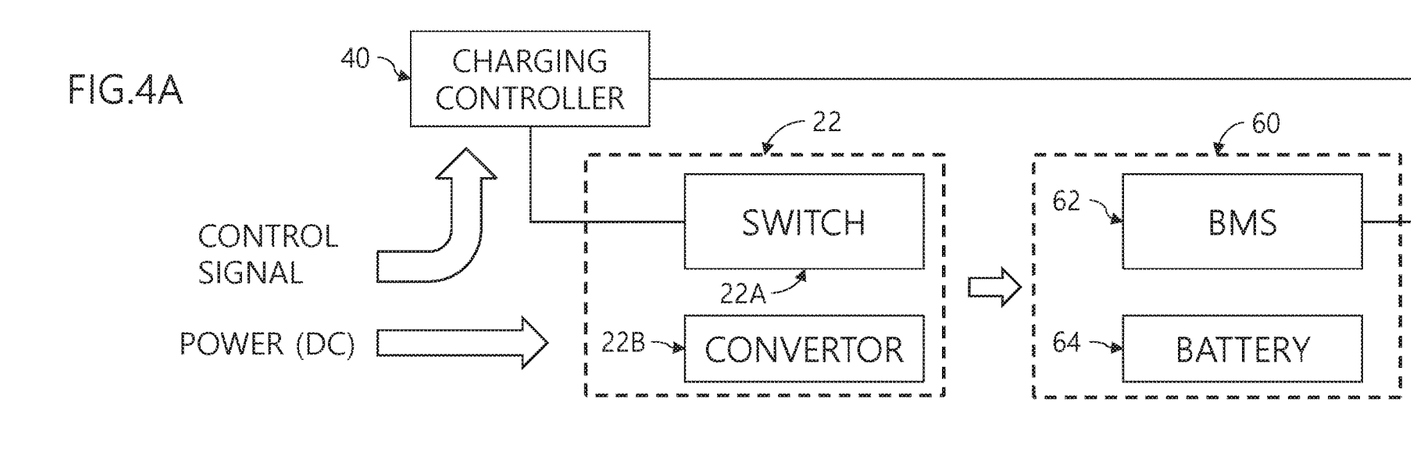
FIGS. 4A and 4B describe a charger and a battery included in a vehicle.
Figure 4B:
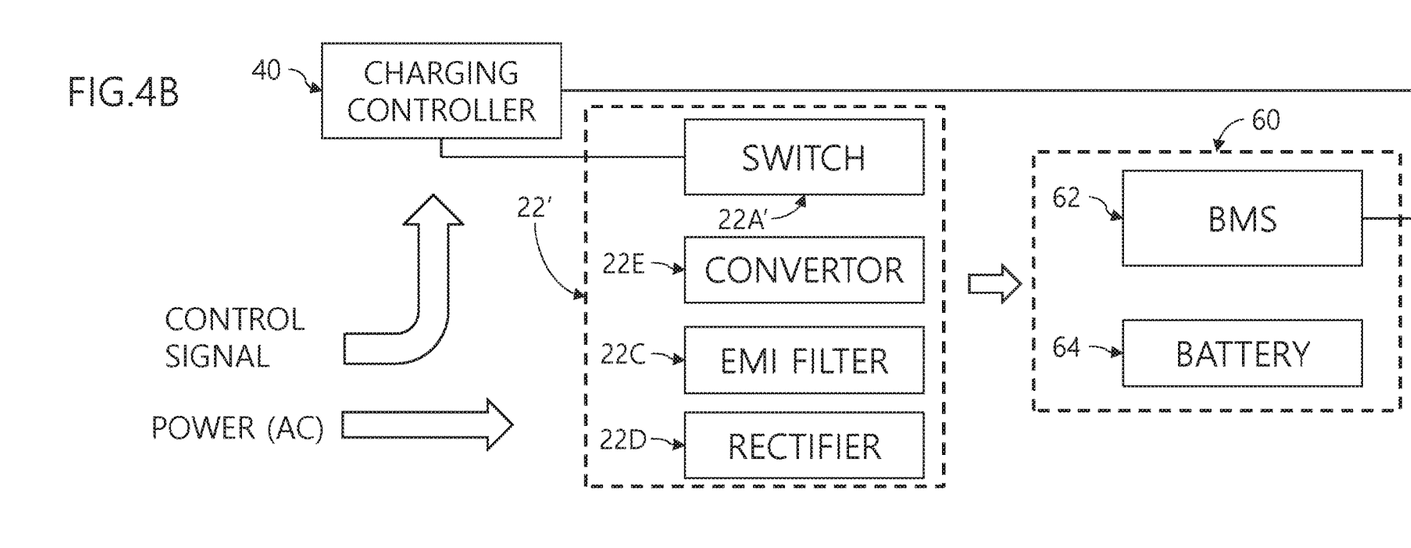

FIGS. 4A and 4B describe a charger and a battery included in a vehicle. Particularly, FIG. 4A shows an in-vehicle device including a charger 22 configured to receive a power signal including a DC signal, while FIG. 4B describes another in-vehicle device including a charger 22' configured to receive a power signal including an AC signal.

Referring first to FIG. 4A, the charger 22 can include a voltage convertor 22A configured to convert the power signal having the DC power signal into the DC voltage signal having the predetermined range, and a switch 22A configured to control an output of the voltage convertor.

A control signal provided by an external power source can be delivered into the charging controller 40, while a power signal entered from the external power source can be delivered into the charger 22. The charging controller 40 can determine a connection status of the charger 22, and handles the charger 22 based at least on the control signal. The charging controller 40 can control the switch 22A included in the charger 22 so as to determine whether an output of the convertor 22A is transferred to the battery unit 60. The DC voltage signal outputted from the charger 22 can be delivered into the battery unit 60.

The battery unit 60 can include at least one battery 64 storing DC power supplied into the charger 22. Further, the battery unit 60 can include a battery management system 62 configured to indicate a battery cell status of the at least one battery 64 to the charging controller 40 in order to achieve charging equilibrium between plural battery cells included in the at least one battery 64, so that the plural battery cells can be fully charged. The battery management system 62 is further configured to monitor at least one of an output current level, an output voltage level and a temperature in real-time, to measure a state of charge of the at least one battery 64, and to estimate a replacement time of the at least one battery 64. To effectively perform a charging operation, the battery management system 62 can indicate plural information about the at least one battery 64 to the charging controller 40.

Referring now to FIG. 4B, the charger 22' can include an Electromagnetic Interferences (EMI) filter 22C configured to remove a noise from the power signal having the AC power signal, a rectifier 22D configured to convert an output of the EMI filter 22C into a DC signal, a voltage convertor 22E configured to convert the DC signal, outputted from the rectifier 22D, into the DC voltage signal having the predetermined range, and a switch 22A' configured to control an output of the voltage convertor 22E. Herein, the switch 22A' can be controlled by the charger controller 40.

The chargers 22, 22' shown in FIGS. 4A and 4B can have some differences with regard to circuitry or components required for receiving a DC power signal or an AC power signal delivered from an external power source and outputting a DC voltage signal having a predetermined range to the battery unit 60. However, during a charging operation, the charging controller 40 may handle at least one charger 22 and the battery unit 60 charged through the at least one charger 22. If there are plural chargers 22, the plural chargers 22 can be coupled in parallel.

Figure 5:
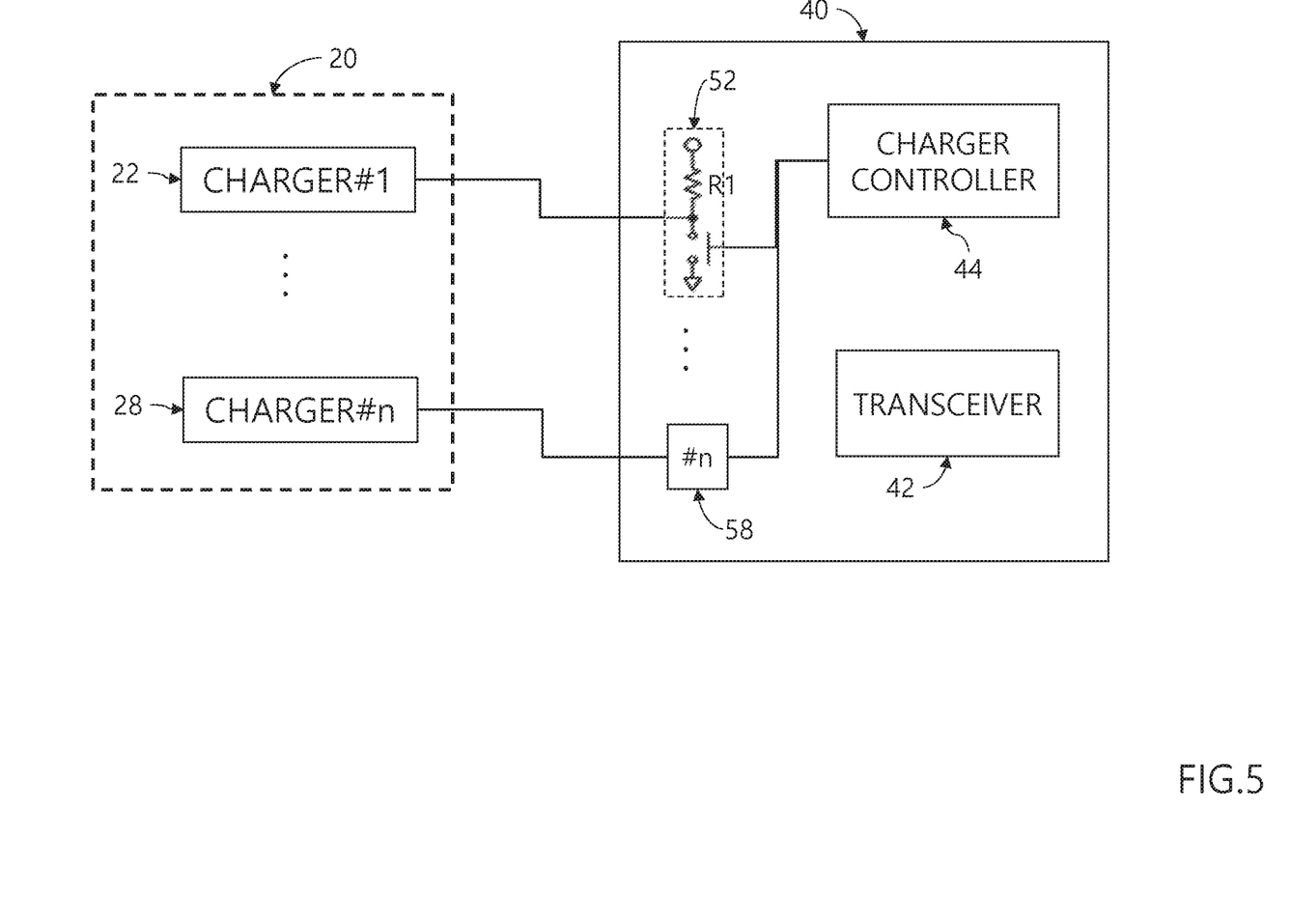
FIG. 5 shows a first charging control apparatus.

FIG. 5 shows a first charging control apparatus.

As shown in FIG. 5, a charging unit 20 includes plural chargers 22, 28. The first charging control apparatus 40 can include an identification signal generator 52, 58 configured to recognize the plural chargers 22, 28. By way of example but not limitation, the identification signal generator 52 can include a pull-up resistor R1 having a different resistance corresponding to each of the plural chargers 22, 28. Each of the plural chargers 22, 28 can include a pull-down resistor having a predetermined resistance corresponding to the pull-up resistor R1 included in the identification signal generator 52 (not shown). Herein, the pull-down resistor in each charger 22, 28 can have the same resistance.

In another example, the identification signal generator 52 can include a pull-down resistor having a different resistance. In this case, each charger 22, 28 can include a pull-up resistor having the same resistance.

As shown in FIG. 5, the first charging control apparatus 40 includes plural identification signal generators 52, 58, each containing a pull-up resistor R1 having different resistance corresponding to each of the plural chargers 22, 28. Because of the pull-up resistor having a different resistance included in the identification signal generators 52, 58, a signal having a different value, or a different variable, can be delivered into each of the plural chargers 22, 28. Based at least on a sensed value (i.e., the different variable delivered from each of the identification signal generators 52, 58), each of the plural chargers 22, 28 can determine an identifier (e.g., an identification, a parameter, or the like) for in-vehicle internal communications such as a communication via a controller area network (CAN). By way of example but not limitation, if a signal of 1 volt (1 V) is entered into a first charger 22, the first charger 22 can use an identifier having a number one by hundreds, e.g., a field value ranged from 100 to 199, for in-vehicle internal communications. If a signal of 2 V is entered into a second charger, the second charger can use an identifier having a number two by hundreds, e.g., a field value ranged from 200 to 299. A third charger receiving a signal of 3 V can use an identifier having a number three by hundreds, e.g., a field value ranged from 300 to 399. The pull-up resistor R1 shown in FIG. 5 is an example for generating an identification signal, and the identification signal can be generated by various circuitries.

The charger controller 44 can measure voltage levels at both sides of the pull-up resistor R1 (not shown) so as to understand how many chargers 22, 28 are actively connected with each other in the charging unit 20 engaged with the first charging control apparatus 40. In another example, after the charger controller 44 recognizes the number of engaged chargers based at least on the pull-up resistors R1 (e.g., different resistances R1 to Rn), some identification signal generators 52, 58 corresponding to the number of engaged chargers could be activated or enabled for performing a charging operation using a power signal delivered via a transceiver 42. When the charger controller 44 recognizes the number of engaged chargers 22, 28, charging loads for each charger during a charging operation can be adjusted or controlled.

Figure 6:
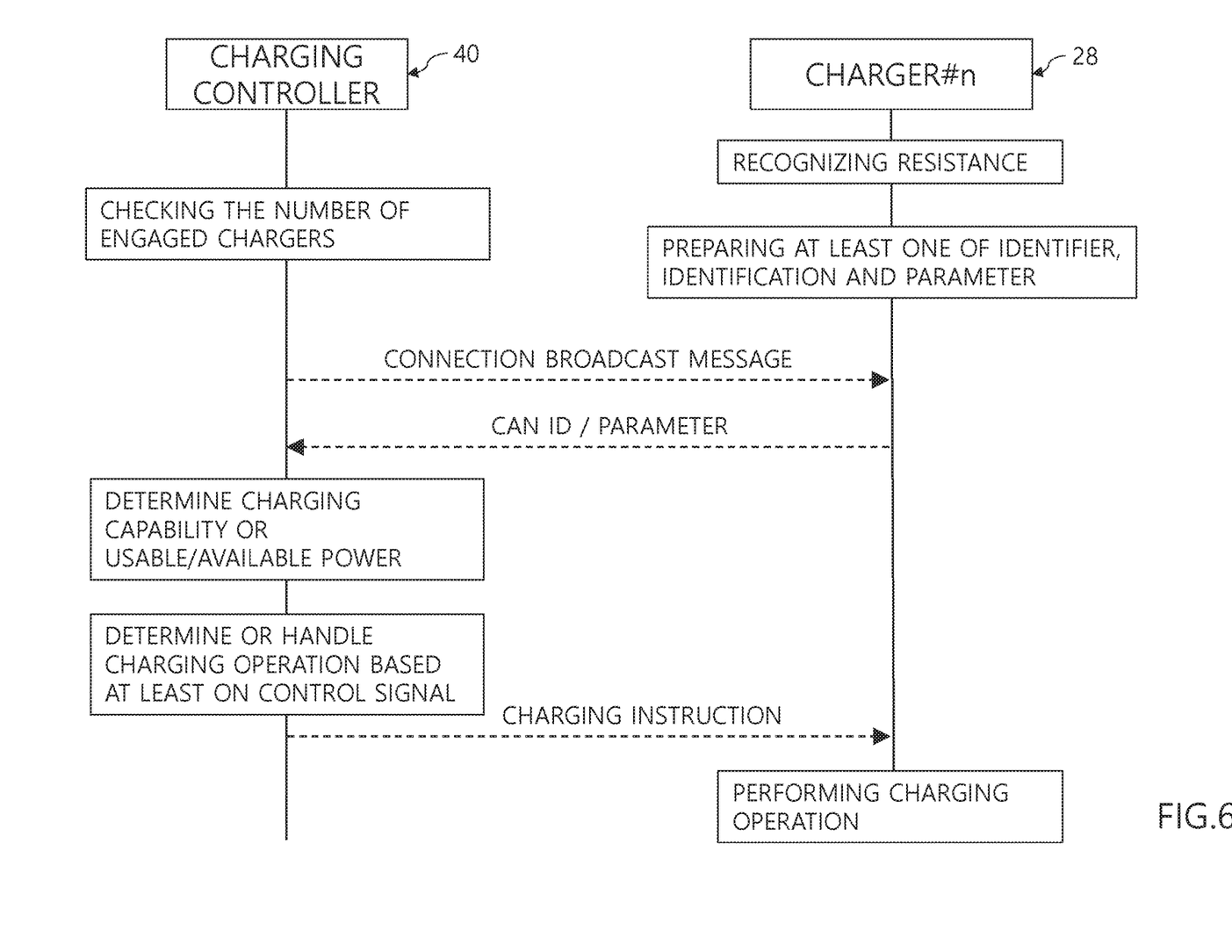
FIG. 6 describes operations of the first charging control apparatus.

FIG. 6 describes operations of the first charging control apparatus 40.

As shown in FIG. 6, the first charging control apparatus 40 can communicate with the charger 28 in order to deal with or control a charging operation.

First, the first charging control apparatus 40 can determine the number of chargers coupled to the first charging control apparatus 40. The first charging control apparatus 40 can broadcast a connection broadcast message to the charger 28.

The charger 28 can receive or detect a value corresponding to a resistance included in the identification signal generator included in the first charging control apparatus 40 to prepare at least one of an identifier, an identification and a parameter, which is used for an in-vehicle network such as a controller area network (CAN).

Based at least on a connection broadcast message transmitted from the first charging control apparatus 40, the charger 28 sends a response signal including at least one of its identifier, its identification and its parameter to the first charging control apparatus 40.

The first charging control apparatus 40 can determine a status of each charger to determine at least one of a charging capability a usable/available power, or the like. Further, the first charging control apparatus 40 can determine or handle a charging operation based at least on a control signal entered via a transceiver.

The first charging control apparatus 40 can deliver a control instruction for each charger 28 based at least on steps or processes of the charging operation, and the charger 28 performs the charging operation based at least on the control instruction.

As described above, it might be not required to assign a different identifier to each charger, to generate an additional field or value included in a control signal used for an in-vehicle network, or to design an additional or new protocol for an in-vehicle communication.

Figure 7:
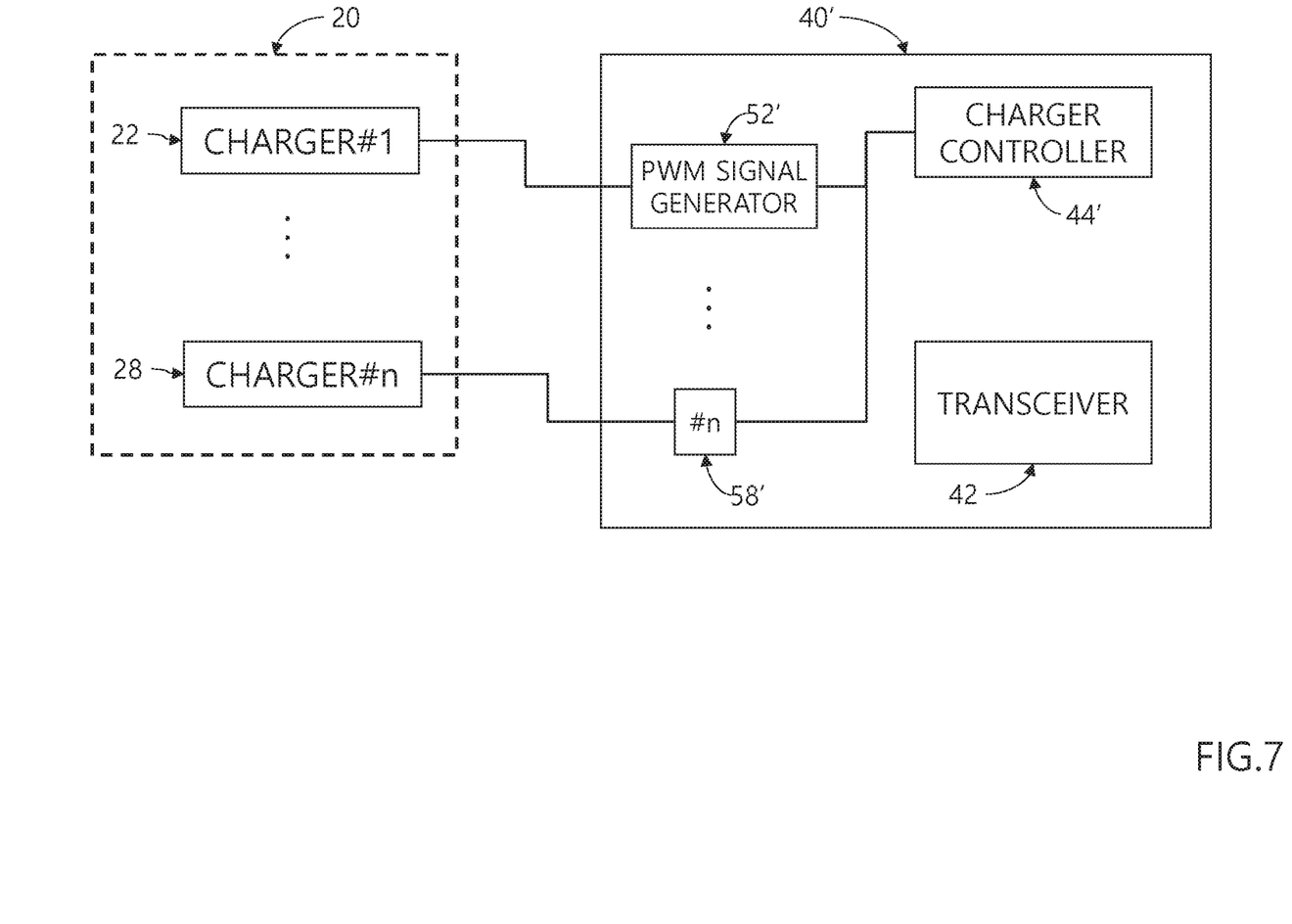
FIG. 7 shows a second charging control apparatus.

FIG. 7 shows a second charging control apparatus.

As shown in FIG. 7, a charging unit 20 includes plural chargers 22, 28. The second charging control apparatus 40' can include an identification signal generator 52', 58' including a PWM signal generator in order to recognize each of the plural chargers 22, 28. For the way of example but not limitation, the identification signal generator 52' can generate a different pulse width modulation (PWM) signal corresponding to each of the plural chargers 22, 28.

The second charging control apparatus 40' includes plural identification signal generators 52', 58', each corresponding to each of the plural chargers 22, 28. Because of the pulse width modulation (PWM) signal having a different pulse width, which is generated by the identification signal generators 52', 58', each of the plural chargers 22, 28 can recognize a different value or a different variable. Based at least on a sensed value, i.e., the different variable delivered from each of the identification signal generators 52', 58', each of the plural chargers 22, 28 can determine an identifier (e.g., an identification, a parameter, or the like) for in-vehicle internal communications such as a communication via a controller area network (CAN).

By way of example but not limitation, if a signal having a 10% pulse width (e.g., a 10% high or low level of each period) is entered into a first charger 22, the first charger 22 can use an identifier having a number one by hundreds, e.g., a field value ranged from 100 to 199, for in-vehicle internal communications. If a signal having a 20% pulse width is entered into a second charger, the second charger can use an identifier having a number two by hundreds, e.g., a field value ranged from 200 to 299. A third charger receiving a signal having a 30% pulse width can use an identifier having a number three by hundreds, e.g., a field value ranged from 300 to 399.

The charger controller 44 can count the number of identifiers (not shown), which the plural chargers 22, 28 use for the in-vehicle communication, so as to understand how many chargers 22, 28 are actively connected with each other in the charging unit 20 engaged with the second charging control apparatus 40'. When the charger controller 44 recognizes the number of chargers 22, 28 activated or engaged for performing a charging operation by using a power signal delivered via a transceiver 42, charging loads for each charger during a charging operation can be adjusted or controlled.

Figure 8:
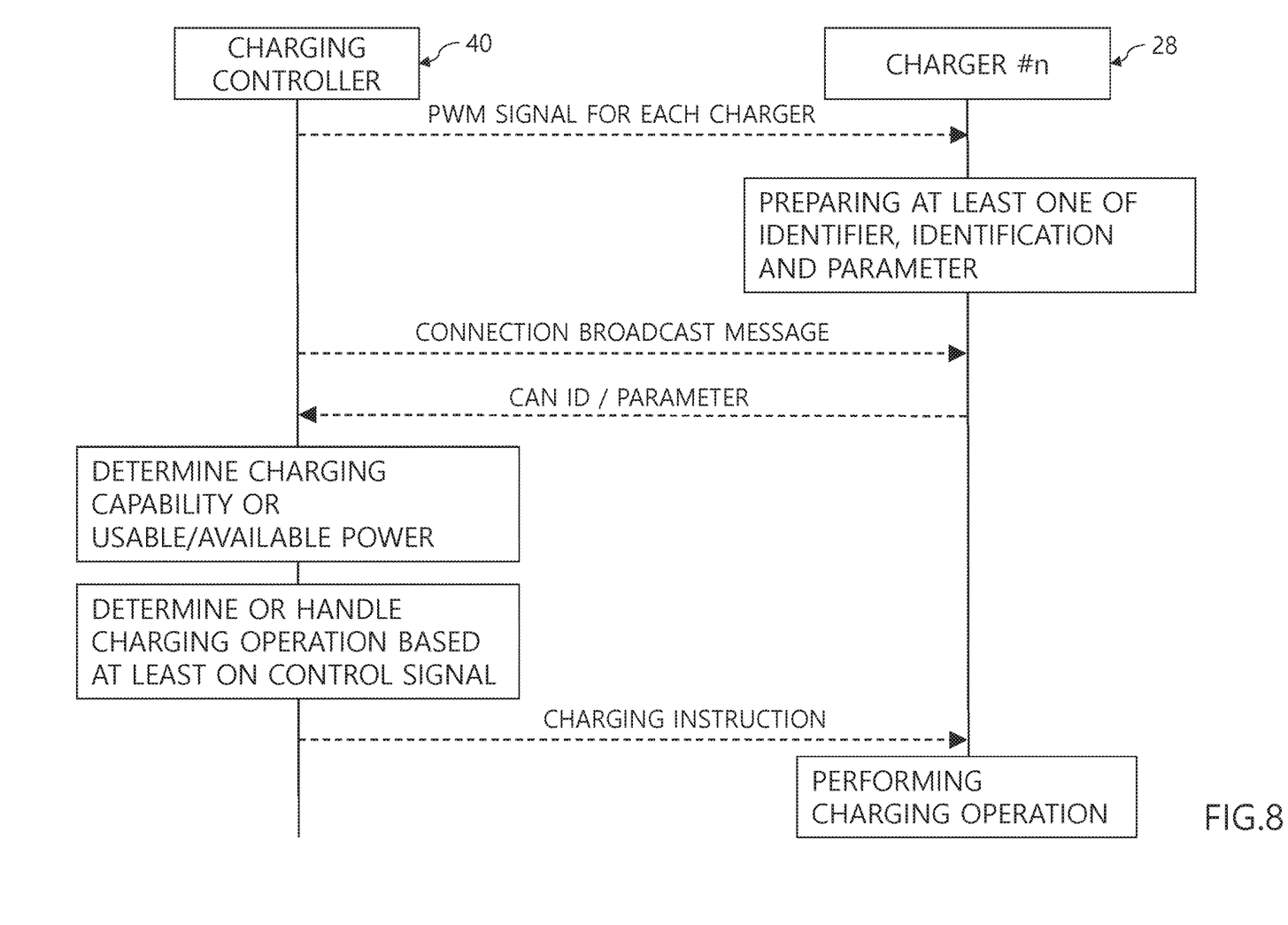
FIG. 8 describes operations of the second charging control apparatus.

FIG. 8 describes operations of the second charging control apparatus 40'.

As shown in FIG. 8, first, the second charging control apparatus 40' can deliver pulse width modulation (PWM) signals, each having a different pulse width, into chargers 28 engaged with the second charging control apparatus 40'.

The charger 28 can receive or detect the pulse width modulation signal transmitted from the second charging control apparatus 40' to prepare at least one of an identifier, an identification and a parameter, which is used for an in-vehicle network such as a controller area network (CAN).

Based at least on a connection broadcast message transmitted from the second charging control apparatus 40', the charger 28 sends a response signal including at least one of its identifier, its identification and its parameter to the second charging control apparatus 40'. The second charging control apparatus 40' can determine a status of each charger to determine a charging capability or a usable/available power. Further, the second charging control apparatus 40' can determine or handle a charging operation based at least on a control signal entered via a transceiver. The second charging control apparatus 40' can also deliver a control instruction for each charger 28 based at least on steps or processes of the charging operation, and the charger 28 performs the charging operation based at least on the control instruction.

Referring to the examples described above, it might not be necessary to assign an additional identifier for each charger, or create or insert new information or a new field into a control signal delivered via an in-vehicle network. Since a single charging controller can control or handle plural chargers equipped in a vehicle, manufacturing costs for in-vehicle charging apparatus can be reduced. Further, because management or control for plural chargers is unified by the single charging controller, it can be easier to optimize a charging efficiency and handle a load balancing. In addition, since a single large charger can be replaced with plural small chargers, installation in a vehicle can be more flexible. For example, one charger can be located proximate to an engine or a motor while two other chargers are arranged proximate to a trunk.

In the above-described embodiments, plural chargers equipped in a vehicle can be controlled by a single integrated controller in order that costs for designing and manufacturing an in-vehicle charging device can be saved. Further, a single controller can control operations of plural chargers so that a vehicle charging operation goes along effectively. Even further, a large capacity battery charger for at least one mass battery can be replaced with plural small capacity battery chargers for plural lower capacity batteries so that restrictions or limitations for designing a vehicle can be reduced.

The aforementioned embodiments are achieved by combination of structural elements and features of the disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the disclosure. The order of operations described in the embodiments of the disclosure may be changed. Some structural elements or features of one embodiment may be included in another embodiment, or may be replaced with corresponding structural elements or features of another embodiment.

It will be apparent to those skilled in the art that various modifications and variations can be made in the disclosure without departing from the spirit or scope of the disclosures. Thus, it is intended that the disclosure covers the modifications and variations of this disclosure provided they come within the scope of the appended claims and their equivalents.

What is claimed is:

1. A method for controlling plural chargers equipped in a vehicle, comprising:
   recognizing a plurality of chargers, each configured to charge at least one battery supplying the vehicle with electric power, via an in-vehicle network;
   receiving an identification and at least one parameter from each recognized charger, which are delivered via the in-vehicle network;
   recognizing the identification of each recognized charger through communication between a charging controller and each recognized charger;
   generating plural instructions, each instruction for each recognized charger in response to receiving the identification and the at least one parameter; and
   delivering the plural instructions to the plurality of recognized chargers via the in-vehicle network, wherein
   when the plurality of chargers are recognized, a connection broadcast message is transmitted to each recognized charger,
   the identification and the at least one parameter is received from a charger having received the connection broadcast message, and
   the recognizing of the identification of each recognized charger comprises:
      measuring voltage levels at both sides of a resistor of each recognized charger to calculate a resistance corresponding to each recognized charger, and
      matching each recognized charger with the resistance corresponding to each recognized charger to recognize the identification of each recognized charger.

2. The method according to claim 1, wherein the identification and the at least one parameter from each charger correspond to resistances having different values.

3. The method according to claim 1, wherein the identification and the at least one parameter from each charger corresponds to pulse width modulation signals having different pulse widths.

4. The method according to claim 1, wherein the plurality of chargers are equipped in the vehicle to connect an external power source with the at least one battery and are coupled in parallel with each other.

5. The method according to claim 1, wherein the delivering of the plural instructions comprises:
   monitoring a status of each of the plurality of chargers to determine an availability of each charger;
   monitoring a power signal provided by an external power source; and
   distributing the power signal according to the determined availability of each charger.

6. The method according to claim 5, wherein the power signal includes at least one of an Alternating Current (AC) power signal and a Direct Current (DC) power signal, and a given charger which receives the power signal converts the power signal into a DC voltage signal having a predetermined range.

7. The method according to claim 1, wherein the in-vehicle network includes a controller area network (CAN).

8. An apparatus having plural chargers for controlling a vehicle charging operation, comprising:
   an identification signal generator generating an identification signal used to recognize a plurality of chargers configured to charge at least one battery supplying the vehicle with electric power;
   a power transceiver transmitting at least one charging control signal to an external power source, or receiving the at least one charging control signal from the external power source; and
   a charger controller recognizing an identification of each recognized charger through communication between the charging controller and each recognized charger and controlling each recognized charger so as to perform a charging operation corresponding to the at least one charging control signal based on the identification signal, wherein
   when the plurality of chargers are recognized, the charger controller transmits a connection broadcast message to each recognized charger,
   the charger controller receives the identification and at least one parameter from a charger having received the connection broadcast message, and
   the recognizing of the identification of each recognized charger by the charger controller comprises:
      measuring voltage levels at both sides of a resistor of each recognized charger to calculate a resistance corresponding to each recognized charger, and
      matching each recognized charger with the resistance corresponding to each recognized charger to recognize the identification of each recognized charger.

9. The apparatus according to claim 8, wherein the identification signal generator includes either plural pull-up or plural pull-down resistances having different values.

10. The apparatus according to claim 8, wherein the identification signal includes a pulse width modulation signal having a different pulse width for each of the plurality of chargers.

11. The apparatus according to claim 10, wherein the identification signal generator includes a plurality of modules, each corresponding to each of the plurality of chargers.

12. The apparatus according to claim 8, wherein the plurality of chargers are equipped in the vehicle to connect the external power source with the at least one battery and are coupled in parallel with each other.

13. The apparatus according to claim 12, wherein a power signal inputted into the plurality of chargers includes at least one of an Alternating Current (AC) power signal and a Direct Current (DC) power signal, and a given charger which receives the power signal converts the power signal into a DC voltage signal having a predetermined range.

14. The apparatus according to claim 13, wherein the given charger comprises:
   a voltage convertor converting the DC power signal into the DC voltage signal having the predetermined range; and a switch controlling an output of the voltage convertor, wherein the switch is controlled by the charger controller.

15. The apparatus according to claim 13, wherein the given charger comprises:
   an Electromagnetic Interferences (EMI) filter removing noise from the AC power signal;
   a rectifier converting an output of the EMI filter into a DC signal;
   a voltage convertor converting the DC signal, outputted from the rectifier, into the DC voltage signal having the predetermined range; and
   a switch controlling an output of the voltage convertor, wherein the switch is controlled by the charger controller.

16. A vehicle equipped with an apparatus configured to obtain motive power from electric energy, the apparatus comprising:
   a battery unit including at least one battery configured to supply the electric energy;
   a charger unit including a plurality of chargers connected with each other in parallel, each configured to use a power signal for charging the at least one battery, wherein the power signal is provided by an external power source; and
   a charging controller recognizing an identification of each charger through communication between the charging controller and each charger and controlling the plurality of chargers based at least on a charging control signal provided by the external power source, wherein
   the charging controller recognizes the plurality of chargers and transmits a connection broadcast message to each recognized charger,
   the charging controller receives the identification and at least one parameter from a charger having received the connection broadcast message, and
   the recognizing of the identification of each recognized charger by the charging controller comprises:
      measuring voltage levels at both sides of a resistor of each recognized charger to calculate a resistance corresponding to each recognized charger, and
      matching each recognized charger with the resistance corresponding to each recognized charger to recognize the identification of each recognized charger.

17. The vehicle according to claim 16, wherein the charging controller comprises:
   an identification signal generator generating an identification signal for recognizing each of the plurality of chargers; and
   a power transceiver transmitting at least one of the power signal and the charging control signal to the external power source, or receiving at least one of the power signal and the charging control signal from the external power source,
   wherein the charger controller controls each charger so as to perform a charging operation corresponding to the charging control signal based on the identification signal.

18. The vehicle according to claim 17, wherein the identification signal is determined based on resistances corresponding to each charger, each resistance having different values from one another, or based on pulse width modulation signals corresponding to each charger, each pulse width modulation signal having a different pulse width from one another.

19. The vehicle according to claim 16, wherein the battery unit comprises a battery management system indicating a battery cell status to the charging controller in order to achieve charging equilibrium between plural battery cells included in the at least one battery.

20. The vehicle according to claim 19, wherein the battery management system monitors at least one of an output current level, an output voltage level, and a temperature in real-time, measures a state of charge of the at least one battery, and estimates a replacement time of the at least one battery.

* * * * *